Patented Sept. 21, 1937

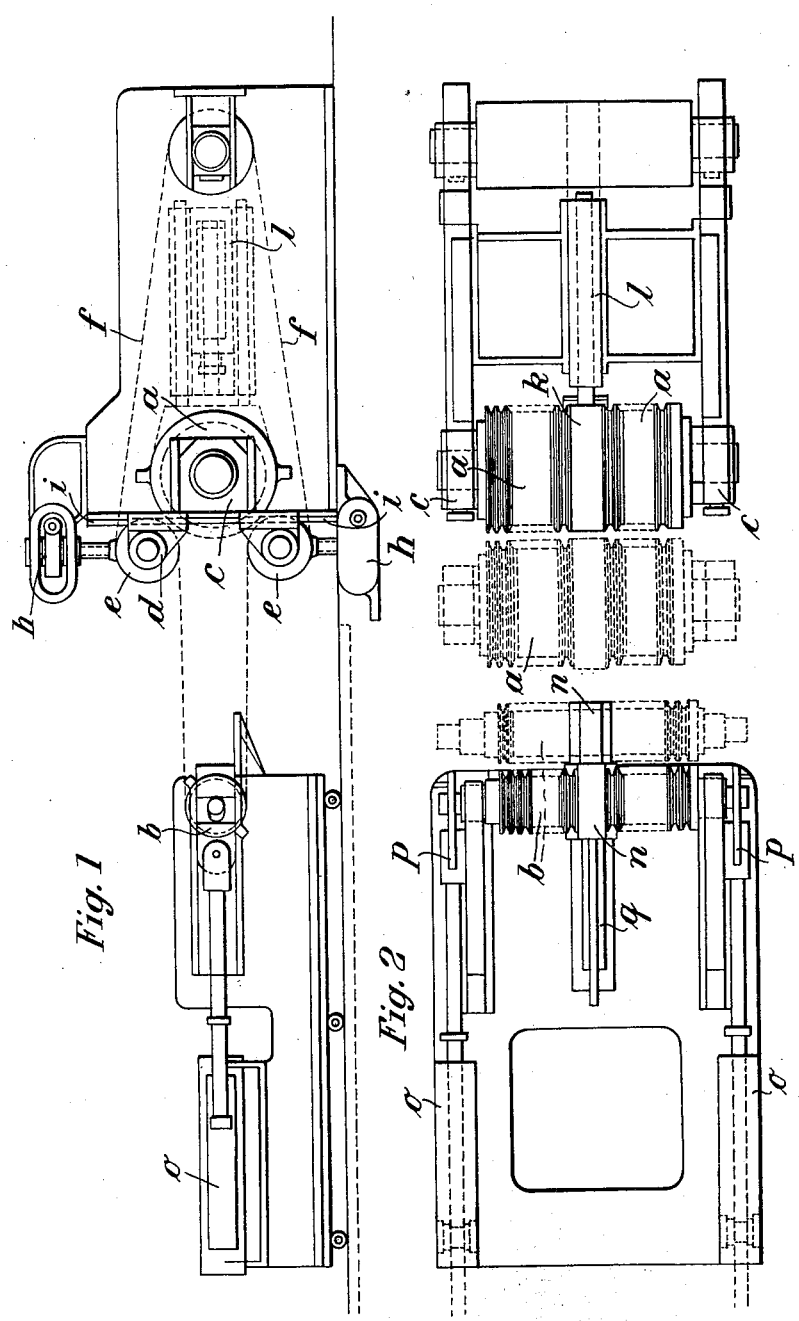

2,093,922

UNITED STATES PATENT OFFICE 2,093,922

VULCANIZING APPARATUS

Hermann Meyer, Hanover, Germany

Application September 8, 1936, Serial No. 99,837
In Germany April 1, 1935

5 Claims. (Cl. 18—6)

This invention relates to apparatus for vulcanizing rubber articles in the form of endless bands, belts and the like and more particularly bands or belts of wedge-shaped cross-sectional form.

Hitherto the vulcanization of endless rubber articles, such as bands or belts of various cross-sections has been effected in the usual form of vulcanizing press, but occupies a considerable time owing to the vulcanization being discontinuous, the sections of the length of the belt or band being vulcanized in succession so that the process is interrupted and furthermore the results obtained are not sufficiently uniform.

Hydraulically operated stretching devices are known, for stretching endless rubber bands or straps comprising oppositely arranged cylinders mounted in pairs of bearings of which one pair is stationary and the other is arranged to be longitudinally movable relative to the first pair. The ordinary form of vulcanizing apparatus is not however provided with a stretching device of this character.

The present invention has for its object to provide improved vulcanizing apparatus for the purpose above described whereby the vulcanizing of endless rubber articles can be effected by the combination of stretching and vulcanizing devices so as to enable the vulcanizing process to be carried out continuously without interruption thereby effecting economy in time and producing a superior result.

The invention is illustrated by way of example in the accompanying drawing of which Figures 1 and 2 are views in side elevation and plan respectively of one form of vulcanizing apparatus embodying the invention and adapted for vulcanizing endless belts of wedge-shaped cross-section.

Referring now to the drawing it will be seen that the apparatus illustrated comprises a vulcanizing drum $a$ adapted to be suitably heated together with a roller $b$, the belt to be vulcanized passing around the drum and roller.

The drum $a$ is mounted in a frame having an opening on at least one side for the bearing or pivot $c$ of the drum $a$. In front of these openings are adjustable stops $d$ (Figure 1) which during operation are set into position in front of the drum bearings $c$.

Guide rollers $e$ are provided carried in bearings which are adjustable in position dependent upon the position of the stops $d$. A pressure band $f$ passes round the rollers $e$, as shown in Figure 1. The stops $d$ are arranged to be adjusted in guides $i$ by means of spindles operated by raising and lowering devices $h$. A sleeve $k$ is rotatably mounted on the middle portion of the heated drum $a$ and is connected to the piston of a pressure cylinder $z$. It will be understood that by moving the stops $d$ carrying the pressure band guiding rollers $e$ apart from each other, the heated drum $a$ with its bearings $c$ can be readily removed from the frame by the action of the pressure cylinder $l$ into the position shown in dotted lines in Figure 2.

The roller $b$ carries the belts to be vulcanized and serves as a stretching device therefor and is mounted in a middle bearing $n$ provided with a guide rod adapted to move in a straight guide $g$. The operating mechanism for the roller $b$ comprises pressure cylinders $o$ arranged on both sides of the roller or of its bearings, these cylinders being provided with pistons and piston rods attached thereto, which are connected to the journal bearings of the roller $b$ by means of disengageable couplings. The pressure operated mechanism serves both for the movement of the roller $b$ in a direction towards the drum $a$ as well as for the stretching of the belt by movement in the opposite direction.

The operation of the apparatus is as follows:—

The heated drum $a$ and the roller $b$ are first moved relative to one another by means of the pressure devices $l$ and $o$ until they occupy the positions shown in dotted lines in Figure 2 in which the drum and roller are only connected to the frame by the bearing members $k$ and $n$ respectively. The couplings $p$ having been disengaged the belts to be vulcanized can now be placed in position from either side on the heated drum $a$ and the roller $b$. The drum and roller are now returned to their operating positions shown in full lines by the action of the devices $l$ and $o$. The heated drum $a$ is now rigidly secured in its operating position (Figure 1) by moving the stops $d$ carrying the guide rollers $e$ towards one another to the position shown by operating the devices $n$ above described. The pressure band $f$ surrounds in the usual manner the greater part of the circumference of the heated drum $a$ in contact with the outer surfaces of the belts to be vulcanized.

The guide roller $b$ can by means of the pressure cylinders $o$ be moved outwards and its position controlled as desired for the purpose of stretching the belts to be vulcanized so that any desired degree of tension can be maintained on the belts during the vulcanizing operation.

The profile of the heated drum $a$ and of the guide roller *b* can be formed as shown so as to correspond to the cross-sectional form of the belts to be vulcanized.

For vulcanizing very long belts the frame for the guide roller *b* (as shown in Figure 1) can be arranged to be located and maintained at any desired distance from the frame for the heated drum.

Having now described my invention, what I claim as new and desire to secure by Letters Patent is:

1. In an apparatus of the character described for vulcanizing rubber articles, in combination a drum, means for normally engaging and supporting the ends of said drum when the apparatus is operating, means cooperating with the middle part of said drum for moving the drum outwardly from said first-mentioned means and supporting the same in its new position.

2. In an apparatus of the character described for vulcanizing rubber articles, in combination a drum having end bearings, guide supporting means for normally engaging and supporting the ends of said drum, and operating means for moving the drum outwardly from said guide supporting means and supporting the drum in its new position.

3. In an arrangement as claimed in claim 1, in which said means cooperating with the middle of said drum is hydraulically operated.

4. In an arrangement as claimed in claim 1, a guide roller positioned parallel to but spaced from said drum.

5. In an arrangement as claimed in claim 1, a guide roller positioned parallel to but spaced from said drum and having means for normally engaging and supporting the ends of said roller when the apparatus is operating, and means cooperating with the middle part of said roller for moving the roller outwardly from its end supporting means and supporting the roller in its new position.

HERMANN MEYER.